United States Patent [19]

DeYoung et al.

[11] Patent Number: 5,132,392

[45] Date of Patent: Jul. 21, 1992

[54] HYDROPHILIC SILICONE-MODIFIED POLYESTER RESIN AND FIBERS AND FILMS MADE THEREFROM

[75] Inventors: Douglas J. DeYoung; Gerald J. Murphy, both of Hopewell Junction, N.Y.

[73] Assignee: Union Carbide Chemicals & Plastics Technology Corporation, Danbury, Conn.

[21] Appl. No.: 813,024

[22] Filed: Dec. 24, 1991

[51] Int. Cl.$^5$ .................................. C08G 63/695
[52] U.S. Cl. ............................. 528/272; 528/283; 528/300; 528/308.6; 528/10; 528/26; 528/29; 528/33; 525/446; 525/474
[58] Field of Search ........... 528/272, 283, 300, 308.6, 528/10, 26, 29, 33; 525/446, 474

[56] References Cited

U.S. PATENT DOCUMENTS

| | | | |
|---|---|---|---|
| 3,296,190 | 1/1967 | Reischl et al. | 524/195 |
| 3,579,607 | 5/1971 | Matzner et al. | 525/446 |
| 3,691,257 | 9/1972 | Kendrick et al. | 525/90 |
| 3,701,815 | 10/1972 | Matzner et al. | 525/446 |
| 3,749,757 | 7/1973 | Marzocchi | 525/101 |
| 4,105,567 | 8/1978 | Koerner et al. | 252/8.6 |
| 4,153,640 | 5/1979 | Deiner et al. | 526/194 |
| 4,348,510 | 9/1982 | Keck et al. | 528/26 |
| 4,452,962 | 6/1984 | Ginnings et al. | 528/26 |
| 4,496,704 | 1/1985 | Ginnings | 528/26 |
| 4,640,962 | 2/1987 | Ostrozynski et al. | 525/474 |
| 4,758,637 | 7/1988 | Merrifield et al. | 525/474 |
| 4,766,181 | 8/1988 | Ostrozynski et al. | 428/395 |
| 4,894,427 | 1/1990 | Yamamoto et al. | 528/26 |
| 4,937,277 | 6/1990 | O'Lenick | 524/318 |

*Primary Examiner*—Samuel A. Acquah
*Attorney, Agent, or Firm*—Joseph F. Leightner

[57] ABSTRACT

Hydrophilic polyester resin is provided by the method comprising reacting an aromatic dicarboxylic acid or diester thereof, a diol and a polysiloxane-polyether copolymer wherein the polysiloxane backbone is endblocked with a hydroxyl-substituted organic group and the polyether portion of the copolymer comprises polyoxyethylene. The resulting silicone-modified polyester is especially suited for making hydrophilic fiber and film.

14 Claims, No Drawings

HYDROPHILIC SILICONE-MODIFIED POLYESTER RESIN AND FIBERS AND FILMS MADE THEREFROM

FIELD OF THE INVENTION

This invention relates to polyester resin which has been polymerized with particular reactive polysiloxanes to obtain a copolymer structure. The resulting silicone-modified polyester resin is hydrophilic and is especially useful for manufacture of fiber and film. The invention also relates to a method for producing hydrophilic polyester resin.

BACKGROUND OF THE INVENTION

Polyesters have been characterized as heterochain macromolecular compounds that possess a plurality of carboxylate ester groups as components of their skeletal structure as distinguished from other ester-containing polymers, such as cellulose esters, poly(acrylates) and poly(vinyl esters), which have carboxylate groups forming part of pendants from the skeletal structure. Polyesters have found wide utility, being used as fibers, films, plasticizers and polyurethane intermediates to name but a few applications.

Although many reactions are possible for the synthesis of polyesters, conventionally the polyesterification of dicarboxylic acids or their functional derivatives with diols followed by a polycondensation reaction is most widely utilized.

Despite being suitable for many applications, polyesters have been treated with a variety of additives to enhance their physical properties. For example, silicones have been used in combination with polyesters to improve lubricity, water repellancy and softness of polyester articles. Traditionally, silicones have been applied topically to the finished polyester; see, for example, U.S. Pat. No. 4,105,567. Topical treatment of polyester and other fabrics, however, results in short-term improvement in fabric properties. Over time and repeated washings, topically silicone-treated polyesters lose their effectiveness as the silicone dissipates. Therefore, it is highly desirable to permanently incorporate the silicone into the polyester resin such that permanent improvement in properties can be realized.

Silicone-modified polyesters which are advantageously used in fibers are described in U.S. Pat. Nos. 4,640,962; 4,766,181; and 4,758,637. These patents disclose silicone-modified polyester resin having discrete domains within the polyester matrix. During melt spinning and cold drawing, the domains undergo migration to the surface of the resulting polyester fiber so as to provide a silicone-sheathed polyester fiber. These patents require that a copolymer domain of a controlled size be formed. In addition, the patents specify that the reactive polysiloxane end groups which are incorporated in the polyester backbone cannot be hydroxy-capped.

There continues to be a need for polyester resin having improved properties such as, in particular, hydrophilicity, for use in fibers and films. Cotton and other cellulosic fibers have the ability to "wick" or draw perspiration from the body resulting in a comfortable feeling for the wearer. In contrast, articles made with a high level of synthetic fibers such as polyester fiber cannot draw moisture from the body and result in a "clammy" feeling to the wearer. Therefore, hydrophilic polyester fiber is desirable because such fiber would behave more like cotton and articles made therefrom would be cooler and thus more comfortable to wear.

Similarly, hydrophilic polyester film is desirable since water would wet the surface better than unmodified polyester film. Improved wetting is important in cleaning the surface of the film.

Accordingly, it is desirable to provide polyester resin which is hydrophilic and which can permanently retain its hydrophilic properties during the useful life of products made therewith.

SUMMARY OF THE INVENTION

The present invention provides modified polyester resins having improved hydrophilicity such that fibers made therefrom behave more like natural fibers such as cotton. Similarly, films made from the modified polyesters of the invention have improved wettability. More particularly, the polyesters of the invention are modified with a polysiloxane-polyether copolymer wherein the polysiloxane backbone is end-blocked with a hydroxyl-substituted organic group and the polyether portion comprises oxyethylene units. Also provided by this invention is a method for producing hydrophilic polyesters which comprises reacting a dicarboxylic acid or its diester, a diol and the aforesaid polysiloxane-polyether copolymer.

DETAILED DESCRIPTION OF THE INVENTION

The essential reactants used in the formation of the silicone-modified polyester resin of the invention include an aromatic dicarboxylic acid or its diester or mixtures thereof, a diol and a polysiloxane-polyether copolymer wherein the polysiloxane backbone is end-blocked with an organic radical comprising a hydroxyl group and the polyether portion comprises oxyethylene units.

Preferred aromatic dicarboxylic acid reactants include those having from 8 to 15 carbon atoms. Preferred diester reactants include the lower ($C_1$-$C_4$) dialkyl esters of such acids. Illustrative aromatic dicarboxylic acid and diester reactants include, but are not limited to, terephthalic acid, dimethylterephthalate, phthalic acid, isophthalic acid, 1,5-naphthalene dicarboxylic acid, 2,6-naphthalene dicarboxylic acid, 4,4'-diphenyl dicarboxylic acid, 4,4'-sulfonyldibenzoic acid, and any combination thereof. It is preferred that symmetrical aromatic dicarboxylic acids or their diesters be employed, most preferably terephthalic acid or dimethylterephthalate, respectively, including mixtures thereof.

Suitable diol reactants include those having from 2 to 8 carbon atoms. Representative examples of such diols include, but are not limited to, one or more of the following:

(a) aliphatic diols such as ethylene glycol, diethylene glycol, propylene glycol, 1,4-butanediol, 1,8-octanediol and the like;

(b) branched chain diols such as neopentyl glycol, 2-methyl-2-ethyl-propanediol-1,3 and 2,2-diethyl-propanediol-1,3; and (c) cycloalkane diols such as cyclohexane dimethanol.

Polysiloxane-polyether copolymers suitable for use in the present invention are those defined by the following Formula I:

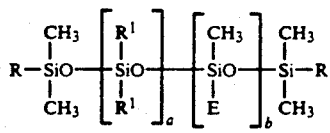

(I)

wherein R, R¹, a, b and E are defined below.

As is evident from Formula I, the silicon-bonded monovalent R groups end block the polysiloxane backbone. The R groups are hydroxyl-bearing groups such as, for example, hydroxyalkyl and hydroxyalkoxyalkyl. Generally R has from 1 to 12, and usually no more than 8, carbon atoms. Preferably R has from 4 to 6 carbon atoms. Especially efficacious is the hydroxyalkoxyalkyl group, $-(CH_2)_3O(CH_2)_2OH$.

In further reference to Formula I, $R^1$ is a monovalent hydrocarbon group having from 1 to 10 carbon atoms. The $R^1$ groups may be the same as or different from one another, and include alkyl, aryl and aralkyl groups as illustrated by methyl, ethyl, butyl, hexyl, phenyl and benzyl. Of these, the lower ($C_1$-$C_4$) alkyls are preferred. Usually, $R^1$ is methyl.

In Formula I, a has a value ranging from 1 to 100, and usually ranges from about 5 to 30. Preferably, a has a value from about 10 to 25. Parameter b of Formula I can have a value from about 1 to 100, although usually the value of b is from about 1 to 20, and is preferably from about 2 to about 15. In a preferred embodiment of the polysiloxane-polyether copolymers encompassed by Formula I, the ratio a:b has a value between about 1:1 and 50:1. Most preferably, the values of a and b are such that the ratio a:b has a value from about 1:1 to about 10:1.

In Formula I, E represents a polyether group having the following general Formula II:

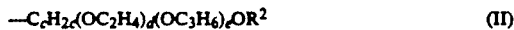

(II)

wherein c has a value from one to eight, and usually has a value from two to four and preferably is three; d is a positive number and preferably is at least about 10; and e is zero or a positive number. Although d and e can each have a value up to 100, usually d is no more than about 30, and e is no more than about 20. It is to be understood that when e is a positive number, the oxyethylene and oxypropylene units may be distributed randomly throughout the polyether chain or in respective blocks of oxyethylene and oxypropylene units or a combination of random and block distributions.

The $R^2$ group of Formula II is an alkyl group having from one to eight carbon atoms, or an acyl group having from two to eight carbon atoms. When $R^2$ is alkyl, it is preferably lower ($C_1$-$C_4$) alkyl such as methyl. When $R^2$ is an acyl group, it is preferable that it have no more than four carbon atoms as exemplified by the acetyl group, $-C(O)CH_3$.

Suitable polysiloxane-polyether copolymers encompassed by Formula I and which are especially useful reactants in the method of this invention include but are not limited to: bis(hydroxyisopropoxypropyl)poly(dimethylsiloxane)polyoxyethylene copolymers having the formula:

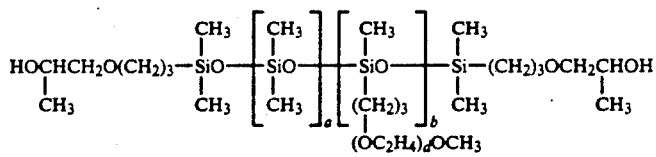

and bis(hydroxyethoxypropyl)poly(dimethylsiloxane)-polyoxyethylene copolymers having the formula:

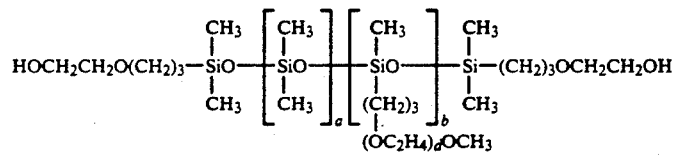

wherein: a, b and c have the values defined above with respect to Formulas I and II.

The relative amount of each of the dicarboxylic acid or diester thereof, diol and polysiloxane-polyether copolymer reactants to one another is important. Too much of the polysiloxane-polyether copolymer can adversely affect the physical properties of the polyester whereas too little will not provide the surface characteristics needed to provide a hydrophilic polyester fiber or film in subsequent processing. Relative to the aromatic dicarboxylic acid or diester, the diol should be present in either a stoichiometric amount or in excess, it being preferred to utilize an excess of the diol. The polysiloxane-polyether copolymer should be present in the reaction mixture in an amount sufficient to obtain from 0.1 to 30 weight percent, based on the total weight of the reaction product, of copolymer units in the polyester matrix. Usually, from 0.2 to 20 and preferably 0.5 to 15.0 weight percent of the polysiloxane-polyether is incorporated into the polyester.

The aromatic dicarboxylic acids and/or diesters thereof, diols and polysiloxane-polyether copolymers are reacted under conditions well known to the polyester art; see, for example, U.S. Pat. No. 4,758,637. Generally, the reaction is carried out under an inert atmosphere at temperatures ranging from about 200° C. to about 300° C. at atmospheric or reduced pressure (i.e., from one atmosphere down to about 0.1 millimeter of mercury pressure). Although the reaction can be carried out in the absence of a catalyst, one or more catalysts are usually employed. Suitable catalysts include acetates, oxides, alkoxylates and other compounds of metals such as manganese, antimony, zinc, lead, zirconium, niobium and germanium.

The silicone-modified polyester resin produced by the process of the invention can be chipped to form pellets for melt spinning or film formation at a later time or can in some continuous systems be subjected to direct melt spinning or film formation. Both melt spinning and film forming operations are well known in the art; see, for example, *Kirk Othmer Encyclopedia of Chemical Technology*, 3rd Ed., Vol. 18 (1982) pp. 536–543 and 563–564. It is during processing of the resin that some of the advantages of the silicone-modified polyester resin of the invention first become apparent.

In contrast to the silicone-modified polyesters described in the prior art such as in U.S. Pat. No. 4,758,637, the compositions of this invention do not contain domains. Instead, in the silicone-modified polyesters of this invention, the polyether-bearing silicone groups are soluble throughout the polymer matrix. This structural dissimilarity is evidenced by the physical appearance of fiber drawn from prior art compositions and from those of the present invention. Thus, the silicone-modified polyesters of the invention provide translucent fibers, whereas the silicone-modified fiber disclosed in the prior art is opaque.

Contrary to the suggestion of the prior art that domains are necessary for migration of silicon atoms to the surface of prior art silicone-modified polyester fiber, it has been found, with respect to fiber made from the silicone-modified polyester of the present invention, that the silicon atoms to which the polyether pendant groups are attached are found at the surface of the fiber at levels approximately ten times above the levels that would otherwise be expected. That is, one would expect the level of the silicon atoms found at the surface of the fiber to be substantially the same as the weight percent of silicon atoms in the polysiloxane incorporated into the modified polyester matrix. Because of the high concentration of silicon atoms at the surface of the fiber, the silicon-bonded polyether groups present in the silicone-modified polyesters of the invention are also in close proximity to the surface of the fiber in unexpectedly higher concentrations. The large concentration of available polyether groups in close proximity to the surface of the fiber (or film) contributes to the hydrophilicity of the fiber (or film) made from the silicone-modified polyesters of the invention.

Without being bound by any particular theory, it is believed that the silicone-containing groups of the polyester matrix provided by the present invention are preferentially drawn to the surface of the fiber or film. The silicone-containing groups have a low surface energy and as a result are drawn to the low energy surface. Although it is known that silicone, which has a low surface energy, will preferentially migrate to a surface, the art suggests that in order to migrate, the silicone needs to be free, not chemically bound.

The prior art also suggests that domain formation is the result of incompatibility between the polyester and silicone segments of the polymer matrix. The resulting incompatibility is the force which drives the silicone-rich domains to the surface during fiber formation to produce the prior art silicone-sheathed polyester fiber. Because no domains are present in the modified polyesters of the present invention, no incompatibility between the polyester and silicone segments is noted.

The silicone-modified polyester fiber produced in accordance with the present invention finds utility in a number of diverse applications. Staple, cut from tow, represents one of the largest uses for silicone-modified polyester fibers. Blends of the silicone-modified polyester fiber may be made with either cotton or wool.

Yarns, such as filament yarns for knitted or woven fabrics, are another important area where silicone-modified polyester fibers can be utilized. Fiberfill for sleeping bags, pillows, garment insulation and the like, is yet another application for silicone-modified polyester fibers in staple or tow form. Other areas of potential use include carpet fiber, electrical insulation, diaper coverstock and the like.

The examples which follow are presented for the purpose of illustrating the invention and are not to be construed as limiting the claims. All parts and percentages are by weight unless otherwise specified.

A. Synthesis of Polysiloxane-Polyether Copolymer Reactant

The polysiloxane-polyether copolymers having Formula I set forth hereinabove, and which are copolymerized into the polyester backbone by the method of the present invention, are synthesized in a multistep process. First, a polyether is reacted with a polysiloxane comprising silicon-bonded hydrogen (—SiH) in a hydrosilation reaction to form a polysiloxane-polyether copolymer intermediate. The intermediate is then reacted with a stoichiometric amount of a siloxane source of the hydroxyl-substituted organic groups shown in Formula I above as the R groups. The latter reaction is a base-catalyzed equilibration reaction and provides the desired polysiloxane-polyether copolymer reactant for use in the present invention. The above steps are exemplified in greater detail below.

(1) Preparation of Polysiloxane-Polyether Intermediate ("Polysiloxane A") defined by the following Formula A:

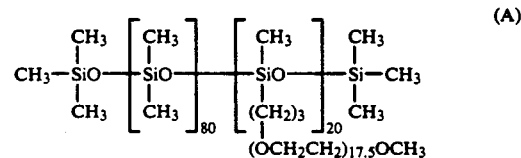

In the first step of the synthesis, a mixture containing 75.2 grams (g) of the allyl polyether, $CH_2=CH-CH_2(OCH_2CH_2)_{17.5}OCH_3$ ("Polyether A"), 25.5 g of the following Si—H containing polysiloxane ("Polysiloxane B")

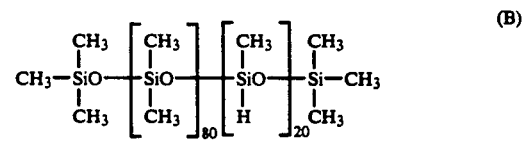

and 51.1 g of toluene were charged to a 500 ml three-necked round bottom flask equipped with a water-cooled condenser, overhead mechanical stirrer and nitrogen inlet. The mixture was heated with stirring to 95° C. at which time 0.5 ml of a $H_2PtCl_2 \cdot 6H_2O$ solution (10 mg platinum per ml ethanol) was added. After approximately 75 minutes the reaction was completed. After allowing the reaction mixture to cool to 60° C., 3.8 g of 1N hydrochloric acid was added. The mixture was then heated to 90° C. and held there for one hour. The flask contents were permitted to cool to 40° C., and then 18 g of sodium bicarbonate was added. This neutralization was allowed to occur for another hour after which time the water was removed in vacuo. The mixture was pressure filtered and the toluene was removed under reduced pressure, leaving a light yellow oil which solidified to a wax on cooling. Gel permeation chromatography results were consistent with the nominal structure shown above for intermediate Polysiloxane A.

(2) Preparation of Polysiloxane-Polyether Copolymer Reactant ("Polysiloxane C") defined by the following Formula C:

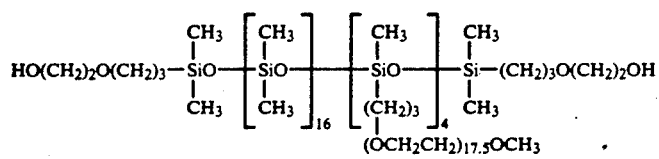

In the second step of the synthesis of Polysiloxane C, a mixture of 70.8 g of Polysiloxane A and 4.04 g of HO(CH$_2$)$_2$O(CH$_2$)$_3$SiOSi(CH$_2$)$_3$O(CH$_2$)$_2$OH (hereinafter called M"M") was charged to a 250 ml three-necked round bottom flask equipped with a water-cooled condenser, overhead mechanical stirrer and nitrogen inlet. The flask contents were heated to 88° C. and 2.3 g of potassium hydroxide catalyst was added. The mixture was heated to 150° C. and held there for two hours. After the contents were allowed to cool to 60° C., 34.4 g of 1N hydrochloric acid was added to the reaction mixture. The mixture was heated to 95° C. and held there for one hour. The flask contents were permitted to cool to 60° C., at which time 30 ml of toluene was added followed by the slow addition of 11.2 g of sodium bicarbonate. This neutralization was continued for another hour after which the water was removed in vacuo. The mixture was pressure filtered and the toluene was removed under reduced pressure leaving an oil which solidified to a wax on cooling. Gel permeation chromatography and NMR results were consistent with the nominal structure of Polysiloxane C shown above as Formula C.

B. Synthesis of Other Polysiloxane-Polyether Copolymer Reactants

Following the synthesis technique described above and varying the stoichometric levels of Polyether A and Polysiloxane B, various polysiloxane-polyether intermediates were prepared. The intermediates ("Polysiloxane D") have the nominal structure defined by the following Formula D:

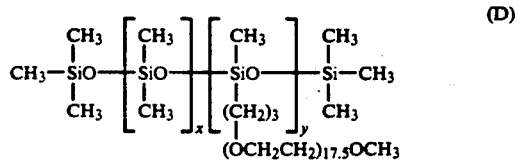

wherein the values of x and y are as given in Table I below, together with the particular amounts employed of reactants Polyether A and Polysiloxane B:

TABLE I

| Reactants | | Polysiloxane D | |
|---|---|---|---|
| Polyether A (g) | Polysiloxane B (g) | x | y |
| 43.74 | 60.05 | 95 | 5 |
| 72.84 | 49.82 | 90 | 10 |
| 71.98 | 29.53 | 83 | 17 |
| 78.64 | 22.01 | 75 | 25 |
| 85.89 | 16.62 | 65 | 33 |
| 90.84 | 11.41 | 50 | 50 |

These various intermediates (Polysiloxane D) were then reacted with varying levels of M"M" using the above-described base-catalyzed equilibration reaction to produce corresponding hydroxyl-endblocked polysiloxane-polyether copolymer reactants ("Polysiloxane E") defined by the following Formula E:

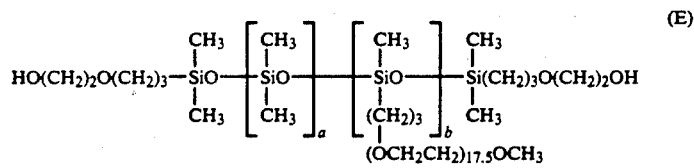

wherein the values of a and b are given in Table II below, together with the particular amounts employed of intermediate Polysiloxane D and M"M":

TABLE II

| Polysiloxane D | | grams charged | M"M" grams charged | Polysiloxane E | |
|---|---|---|---|---|---|
| x | y | | | a | b |
| 95 | 5 | 20.00 | 2.33 | 19 | 1 |
| 90 | 10 | 45.02 | 3.93 | 18 | 2 |
| 83 | 17 | 70.04 | 4.49 | 17 | 3 |
| 75 | 25 | 60.07 | 2.92 | 15 | 5 |
| 65 | 33 | 70.73 | 2.80 | 13 | 7 |
| 50 | 50 | 70.17 | 2.01 | 10 | 10 |

EXAMPLE 1

Preparation of Polysiloxane-Polyether Modified Polyethylene Terephthalate

A mixture of dimethylterephthalate (150 g, 0.773 mole), ethylene glycol (119 g, 1.92 mole) and Irganox ® 1010, an anti-oxidant available from Ciba-Geigy Corporation (0.10 g, 375 ppm), was charged into a 300 ml stainless steel reactor the day prior to polymerization. The reactor base was fitted with a stainless steel plug and cap, sealed by an aluminum washer. The reactor head screwed into an agitator shaft mount. The reactor was cooled by both a water jacket and a side arm condenser. The reactor was heated by a heating mantle. Argon gas was bled in through a closeable valve and taken off through a gas bubbler. Distillates were collected in a ground glass-jointed receiver connected to the end of the side arm condenser by a glass take-off adapter. A mixture of 0.06 g of antimony trioxide, 0.05 g of manganese diacetate tetrahydrate and 3.0 mole % of Polysiloxane C (based on the weight of the dimethylterephthalate) was added to the reactor which was assembled and placed under a positive argon gas flow. The reactor mantle was set at 150° C. After one-half hour, the mixture was sufficiently molten to begin stirring at 10 rpm and the internal temperature was raised to 200° C. The agitation was increased to 50 rpm and clear methanol distillate was collected over the next 2.5 hours. The internal temperature was then increased to 260° C. and clear ethylene glycol distillate was collected over the next 1.5 hours. After complete purging with argon, the reactor was disconnected from the gas bubbler and attached to a high vacuum pump fitted with a dry ice/acetone cooled vacuum trap. The inclusion of a needle valve in the pump line allowed for gradual increase of the vacuum over the next hour from atmospheric pressure to about 5 mm Hg. A second portion of the ethylene glycol distillate was collected, and then the system was opened to full vacuum. The internal temperature was raised to 275° C. and the agitator motor speed was increased. The agitator motor was stopped and the polymer was allowed to settle in the reactor for five minutes. The reactor bottom was removed and the molten polymer was collected in a shallow pan. Evaluation of fiber made with polyester modified with a polysiloxane-polyether copolymer having the nominal structure shown above for Polysiloxane C is included with the results given in Table III hereinbelow.

EXAMPLE 2

Fiber Wettability Measurements

To quantify differences in fiber hydrophilicity and wettability, measurements were conducted at Textile Research Institute in Princeton, N.J. to study the hydrophilicity of single fibers over 25 centimeters of their length. A series of measurements were conducted by attaching the fiber to a microbalance on one end, threaded through a stainless steel ring 5-10 mm in diameter, and connected to an appropriate weight at the bottom to maintain verticality of the fiber. The stainless steel ring was mounted on a stage which can be moved up or down at a very slow precise speed, e.g., 0.2 mm/second. Water was carefully introduced into the ring to form a membrane within its perimeter. The force exerted by the water film on the fiber was then monitored and recorded at a predetermined rate (maximum rate of 16 mm/second) as the ring moves up and down the filament. The advancing contact angle was the angle formed by the fiber at the top of the liquid membrane as the film is moving up towards the microbalance. The contact angle was measured and is typically reported as the $\cos \theta$. A larger $\cos \theta$ value indicates better wettability.

Respective fibers were made with unmodified polyester (control) and with polyester having the hydroxyl-bearing polysiloxane-polyether copolymers encompassed by above Formula E incorporated therein (Runs A-D). The respective fibers were tested following the above procedure and the contact angles measured. The results are given in Table III:

TABLE III

| Run | % Polysiloxane Incorporated* | Polysiloxane Formula E | | $\cos \theta$ |
|---|---|---|---|---|
| | | a | b | |
| Control | 0 | Not applicable | | 0.124 |
| A | 3 | 16 | 4 | 0.230 |
| B | 3 | 10 | 10 | 0.214 |
| C | 6 | 10 | 10 | 0.273 |
| D | 3 | 20 | 5 | 0.180 |

*Weight percent Polysiloxane, based on dimethylterephthalate charged.

The above results show that the control sample with no polysiloxane incorporated had the lowest $\cos \theta$ value, and thus the poorest hydrophilicity. Runs A, B and D with 3% polysiloxane incorporated had higher $\cos \theta$ values. The above results also demonstrate that increasing the amount of the polysiloxane incorporated into the polyester fiber increased the hydrophilicity of the fiber. Run C with 6% polysiloxane incorporated had the highest $\cos \theta$ value, and thus the best wettability.

EXAMPLE 3

Polysiloxanes having the nominal structure defined by Formula E hereinabove were reacted with dimethylterephthalate and ethylene glycol to provide correspondingly modified polyesters substantially following the procedure of Example 1. Table IV below sets forth the values of parameters a and b of Formula E for each copolymer reactant (Polysiloxane E) and the percent of copolymer reactant incorporated.

To identify whether the polysiloxane modification made the polyester hydrophilic, the contact angle of distilled water on thin films made with the modified polyesters was determined. A smaller contact angle demonstrates better wettability. The procedure followed in these tests involved the use of a Pasadena press to make thin films of the modified polyesters between two pieces of Teflon ® coated aluminum foil at 530° F. The contact angle measurements were made employing a gonimeter. Each film was tested at six different locations by employing a 25 micron droplet of distilled water at the surface. The results of the contact angle tests are given in Table IV below which also includes the contact angle for film made with unmodified polyester as the control.

TABLE IV

| Run | % Polysiloxane Incorporated* | Polysiloxane Formula E | | Contact Angle (°) |
|---|---|---|---|---|
| | | a | b | |
| Control | 0 | Not applicable | | 102 |
| A | 1 | 16.7 | 3.3 | 75.1 |
| B | 5 | 16.7 | 3.3 | 66.8 |
| C | 10 | 16.7 | 3.3 | 64.1 |
| D | 5 | 18 | 2 | 94.6 |
| E | 5 | 16 | 4 | 74.2 |
| F | 5 | 15 | 5 | 71.6 |
| G | 5 | 13.3 | 6.6 | 71.5 |
| H | 5 | 10 | 10 | 58.7 |

*Weight percent Polysiloxane, based on dimethylterephthalate charged.

The results set forth in Table IV show that a small amount of polysiloxane modification (i.e., only 1% as used in Run A) resulted in a significant decrease in the water contact angle which demonstrates that the wettability of the films was significantly enhanced. Hydrophilicity of the polyester also was improved by increasing the percent of polysiloxane incorporated (Runs A-C). Further improvement in hydrophilicity was achieved by increasing the value of parameter b which, as shown by Formula E, designates the number of polyether groups present in the polysiloxane reactant (Runs D-H). The improvement in hydrophilicity demonstrates that the polyether pendant groups are near the surface of the films formed from the particular polysiloxane-polyether modified polyesters of the invention.

Confirmation of the surface migration of the polyether-bearing polysiloxane groups during the pressing of the films was obtained by X-Ray Photoelectron Spectroscopy. The spectroscopic data revealed that there is a 10-fold silicon atom enrichment of the surface of the films versus the bulk, as determined by elemental analysis. This result confirms that the polysiloxane-polyether groups are unexpectedly present in high concentration at the surface of the films. The polyether pendant groups bonded to the polysiloxane backbone are also available at the surface, thereby rendering the modified polyester hydrophilic.

EXAMPLE 4

Durability of the hydrophilic surface of films similar to those of Example 3 was tested by immersing the films in water with agitation for two hours. After drying the films, the contact angle was measured using a gonimeter. The results before and after washing for two different siloxane modifications, as well as for unmodified polyester (control) are reported in Table V below.

TABLE V

| Run | Polysiloxane Formula E | | Contact Angle (°) | |
|---|---|---|---|---|
|  | a | b | Initial | 2 Hour |
| Control | — | — | 102 | Not Done |
| A* | 13 | 7 | 49.7 | 62.8 |
| B* | 15 | 5 | 64.9 | 71.6 |

*Polysiloxane at 5% loading relative to dimethylterephthalate charged.

The above results demonstrate the substantial retention of the hydrophilic nature of the polyester modified with the particular polysiloxane-polyether copolymers described herein.

We claim:

1. A process for preparing a hydrophilic silicone-modified polyester resin which comprises reacting an aromatic dicarboxylic acid or diester thereof, a diol and a polysiloxane-polyether copolymer wherein the polysiloxane portion of the copolymer is end-blocked with a hydroxyl-substituted organic group and wherein the polyether portion of the copolymer is comprised of oxyethylene units.

2. The process of claim 1 in which the hydroxyl-substituted organic group is a hydroxyalkoxyalkyl group.

3. The process of claim 2 in which the hydroxyl-substituted group is —(CH$_2$)$_3$O(CH$_2$)$_2$OH.

4. The process of claim 2 in which the hydroxyl-substituted group is

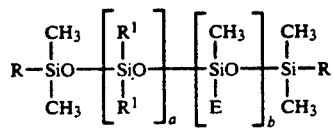

5. The process of claim 1 in which the hydroxyl-substituted organic group is a hydroxyalkyl group.

6. The process of claim 1 in which the aromatic dicarboxylic acid or diester thereof is terephthalic acid or dimethylterephthalate.

7. The process of claim 1 in which the diol is ethylene glycol.

8. A process for preparing a hydrophilic silicone-modified polyester resin which comprises reacting an aromatic dicarboxylic acid or diester thereof, a diol and a polysiloxane-polyether copolymer having the formula:

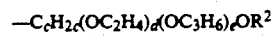

wherein:
R is a hydroxyalkyl or hydroxyalkoxyalkyl group containing no more than 12 carbon atoms;
R$^1$ is a monovalent hydrocarbon group having from one to ten carbon atoms;
a and b each has a value from about 1 to 100;
E is a polyether group having the general formula:

—C$_c$H$_{2c}$(OC$_2$H$_4$)$_d$(OC$_3$H$_6$)$_e$OR$^2$ in which c has a value of from one to eight; d is a positive number; e is zero or a positive number; and R$^2$ is an alkyl group having one to eight carbon atoms or an acyl group having two to eight carbon atoms.

9. The process of claim 8 in which R$^1$ and R$^2$ are methyl.

10. The process of claim 8 in which R is —(CH$_2$)$_3$O(CH$_2$)$_2$OH.

11. The process of claim 8 in which the diol is ethylene glycol and the diester is dimethylterephthalate.

12. A hydrophilic silicone-modified polyester resin comprising the reaction product of an aromatic dicarboxylic acid or diester thereof, a diol and a polysiloxane-polyether copolymer wherein the polysiloxane portion of the copolymer is end-blocked with a hydroxyl-substituted organic group and wherein the polyether portion of the copolymer is comprised of oxyethylene units.

13. The resin of claim 12 in which the hydroxyl-substituted group is —(CH$_2$)$_3$O(CH$_2$)$_2$OH.

14. The resin of claim 13 in which the diester is dimethylterephthalate and the diol is ethylene glycol.

* * * * *